(12) United States Patent
Hatano et al.

(10) Patent No.: US 8,089,185 B2
(45) Date of Patent: Jan. 3, 2012

(54) ACTUATOR HAVING A ROTATION PREVENTION LINK PLATE

(75) Inventors: Kenta Hatano, Tokyo (JP); Hirofumi Doi, Tokyo (JP); Toshihiko Miyake, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 327 days.

(21) Appl. No.: 12/305,872

(22) PCT Filed: Apr. 19, 2007

(86) PCT No.: PCT/JP2007/058531
§ 371 (c)(1),
(2), (4) Date: Dec. 19, 2008

(87) PCT Pub. No.: WO2008/035481
PCT Pub. Date: Mar. 27, 2008

(65) Prior Publication Data
US 2010/0231070 A1    Sep. 16, 2010

(30) Foreign Application Priority Data
Sep. 19, 2006    (JP) ................................. 2006-252916

(51) Int. Cl.
*H02K 7/06* (2006.01)
(52) U.S. Cl. ................. 310/80; 251/129.11; 123/568.23
(58) Field of Classification Search .................. 310/80; 251/129.11, 129.12; 123/568.23, 568.24
See application file for complete search history.

(56) References Cited

U.S. PATENT DOCUMENTS

| 3,797,602 A | * | 3/1974 | Sumida .......................... 180/401 |
| 5,333,989 A | * | 8/1994 | Missana et al. ................... 415/17 |
| 5,417,083 A | * | 5/1995 | Eber ................................ 62/528 |
| 2008/0129133 A1 | * | 6/2008 | Taube et al. ...................... 310/80 |
| 2010/0231070 A1 | * | 9/2010 | Hatano et al. .................... 310/80 |

FOREIGN PATENT DOCUMENTS

| EP | 1 701 063 A1 | 9/2006 |
| JP | 62-198853 U | 12/1987 |
| JP | 2002-327709 A | 11/2002 |
| JP | 2004-360804 A | 12/2004 |
| JP | 2005-188571 A | 7/2005 |
| WO | 2005096472 | * 10/2005 |

* cited by examiner

*Primary Examiner* — Karl Tamai
(74) *Attorney, Agent, or Firm* — Birch, Stewart, Kolasch & Birch, LLP

(57) ABSTRACT

An actuator having an output axis which is moved linearly by a rotatory force, and a boss for holding the above-mentioned output axis in such a way that the output axis can move linearly includes a connecting member for propagating the linear motion of the above-mentioned output axis to an external device. The above-mentioned connecting member is comprised of a joint connected to the above-mentioned output axis, and a link plate having an end rotatably connected to the above-mentioned joint, and another end rotatably connected to the external device. A mechanism for preventing rotation of the above-mentioned output axis is constructed of only a connecting portion for connecting the above-mentioned joint, the above-mentioned link plate, and the above-mentioned external device to one another.

5 Claims, 5 Drawing Sheets

CONVENTIONAL ART

ACTUATOR HAVING A ROTATION PREVENTION LINK PLATE

FIELD OF THE INVENTION

The present invention relates to an actuator equipped with a connecting member for connecting the actuator to an external device.

BACKGROUND OF THE INVENTION

As a conventional actuator, there has been provided an actuator, as shown in FIG. 7, in which a plane extending in parallel to the length of an output axis is formed in such a way as to construct a rotation prevention mechanism. In a case in which such an actuator is connected to an external device, a joint 11 connected to the output axis of the actuator is connected to an end of a link plate 13 with a pin 20 and a locking ring 21 in such a way that the joint 11 can rotate around a central axis GG, and another end of the line plate 13 is connected to a lever 2 of the external device with a pin 14 and a locking ring 15 in such a way that the link plate 13 can rotate around a central axis HH, as shown in FIG. 8. Patent reference 1 discloses an actuator in which a notch extending along an axis is formed in an output axis, and a projection fitted into the above-mentioned notch is formed in a casing of the actuator in such a way as to construct a rotation prevention mechanism.

[Patent reference 1] JP, 2002-327709, A

A problem with the conventional actuators constructed as mentioned above is that in a case in which a rotation prevention mechanism is disposed in the output axis, the outer diameter of the output axis has to be made thick in order to ensure the mechanical strength of the output axis, and therefore the actuator becomes enlarged. Another problem is that the provision of the rotation prevention mechanism increases the manufacturing cost of the actuator. A further problem is that when connected to an external device, because the locking rings are used in the following two places a connecting place at which the joint is connected to the link plate, and a connecting place at which the link plate is connected to the lever, the distance c from the link plate 13 to the locking ring 21, i.e., the play of the connecting portion in the axis direction becomes large. A still further problem is that there is a play due to the rotation prevention mechanism also in the actuator, and sticking occurs depending on the positional relation between the actuator and the external device when the actuator is attached to the external device.

The present invention is made in order to solve the above-mentioned problems, and it is therefore an object of the present invention to provide an actuator which can prevent sticking from occurring and can reduce its manufacturing cost, which can be downsized, and which is equipped with a connecting member for connecting the actuator to an external device.

DISCLOSURE OF THE INVENTION

In accordance with the present invention, there is provided an actuator having an output axis which is moved linearly by a rotatory force, and a boss for holding the above-mentioned output axis in such a way that the output axis can move linearly, characterized in that the actuator includes a connecting member for propagating the linear motion of the above-mentioned output axis to an external device, the above-mentioned connecting member is comprised of a joint connected to the above-mentioned output axis, and a link plate having an end rotatably connected to the above-mentioned joint, and another end rotatably connected to the external device, and a mechanism for preventing rotation of the above-mentioned output axis is constructed of only a connecting portion for connecting the above-mentioned joint, the above-mentioned link plate, and the above-mentioned external device to one another.

In accordance with the present invention, the mechanism for preventing rotation of the output axis is constructed of only the connecting portion for connecting the joint, the link plate, and the external device to one another. Therefore, the present invention offers an advantage of being able to prevent occurrence of sticking due to a positional relation between the actuator and the external device when the actuator is attached to the external device. Furthermore, because no rotation prevention mechanism is disposed in the output axis, the present invention offers another advantage of being able to reduce the manufacturing cost of the actuator and downsize the actuator.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
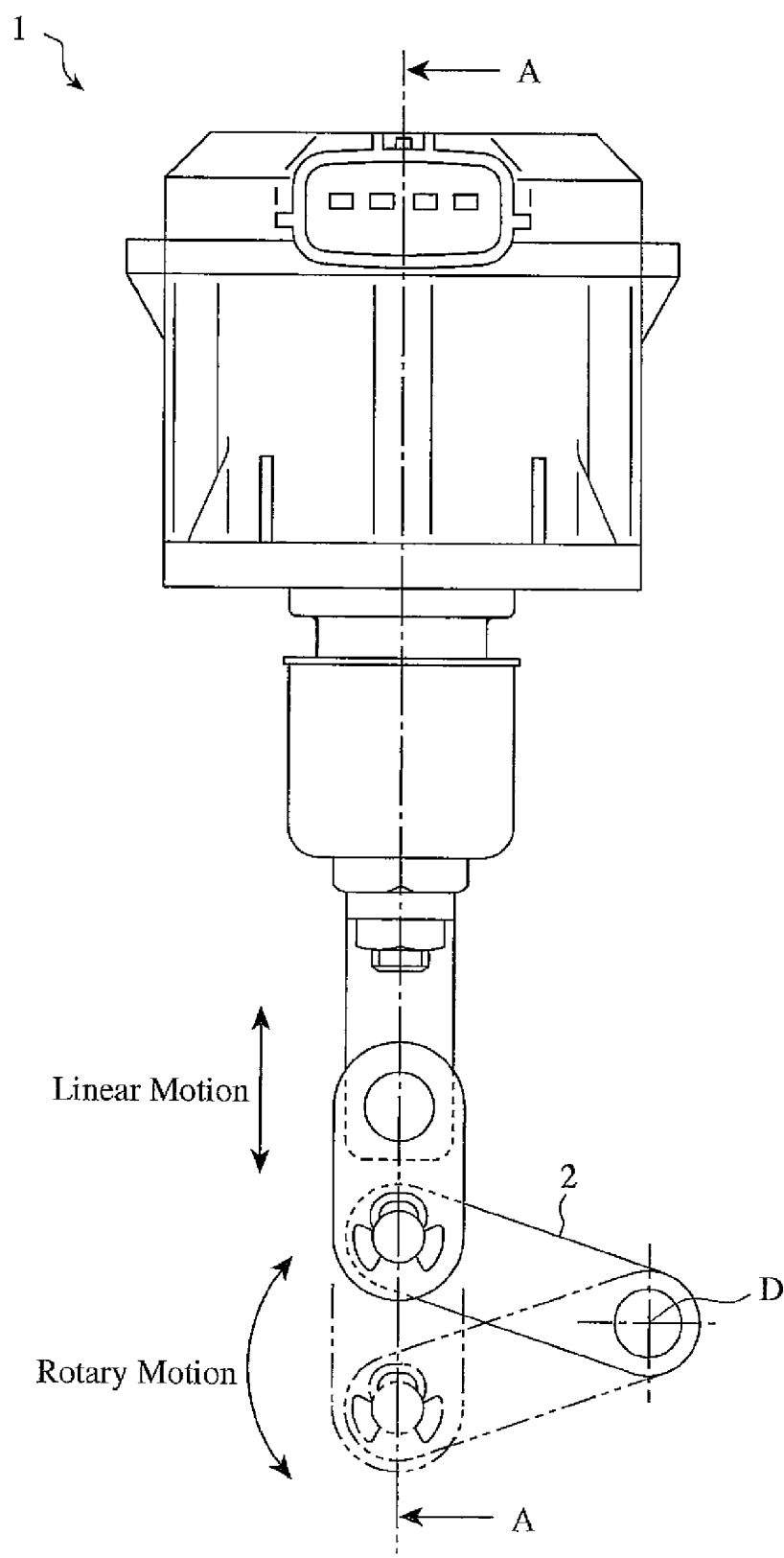
FIG. 1 is a view showing an example of the structure of an actuator in accordance with Embodiment 1.

FIG. 1 is a view showing an example of an actuator 1 in accordance with Embodiment 1 of the present invention. An output axis which is linearly driven by a rotatory force is connected to a lever 2 for adjusting the vane open degree of a turbocharger (not shown), which is disposed as an external device, by way of a connecting member. Reference character D shows a central point around which the lever 2 rotates. This lever 2 rotates around the central point D in a plane parallel to the page of FIG. 1. In this Embodiment 1, an actuator which uses an electromagnetic force (a motor) as a method of rotating the output axis will be explained, though another driving method can be used as long as the use of the other driving method can make the output axis rotate. The actuator in accordance with the present invention can be alternatively connected to another apparatus, as the external device, other than the turbocharger.

Figure 2:
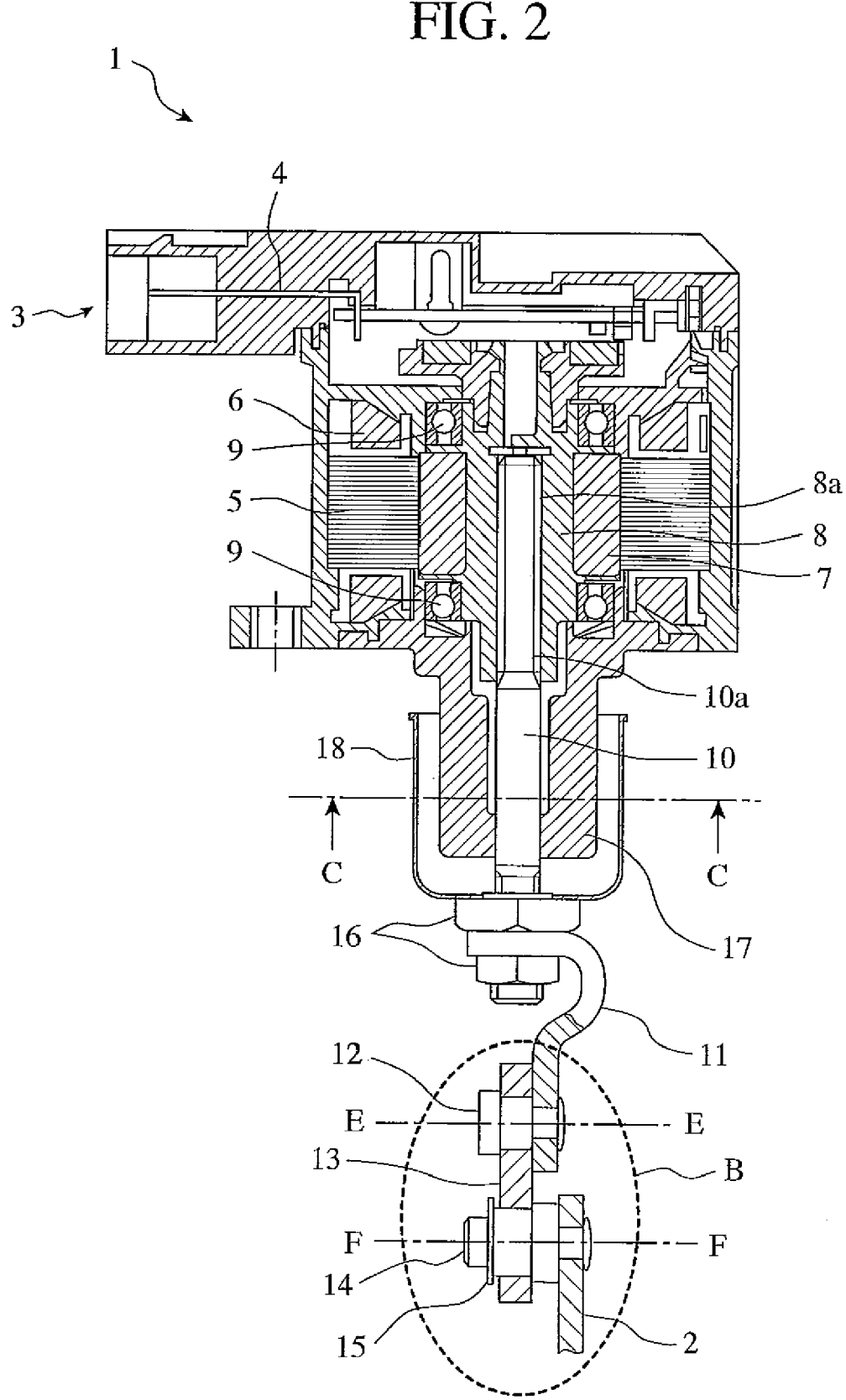
FIG. 2 is a partially sectional view taken along the A-A line shown in FIG. 1.

FIG. 2 is a partially sectional view taken along the A-A line shown in FIG. 1. The actuator 1 is comprised of an external I/O connector 3 for connecting the actuator to an external power supply for applying a voltage thereto, a terminal 4 for supplying the voltage applied to the external I/O connector 3 to the interior of the actuator, a coil 6 to which the voltage is applied, via the terminal 4, from the exterior of the actuator, a stator 5 around which the coil 6 is wound, a rotor 8 having a magnet 7, and rotatably held by a bearing 9, the output axis 10 having a male screw portion 10a which is screwed into a female screw portion 8a formed in a central part of the rotor 8, a boss 17 for holding the output axis 10 in a state in which the output axis 10 is projecting in such a way that the output axis 10 can move linearly, a joint 11 attached to a leading end of the output axis 10 with a nut 16, and a link plate 13 which is connected to the joint 11 with a pin 12 in such a way that the link plate 13 can rotate around a central axis EE of the pin 12. The link plate 13 is connected to a lever 2 with a pin 14 and a locking ring 15 in such a way that the link plate 13 can rotate around a central axis FF of the pin 14. The joint 11, the pin 12, the link plate 13, and the nut 16 construct the connecting member. A cover 18 prevents adhesion of a foreign object, such as dust, or a fluid, such as water, to the output axis 10.

Figure 3:
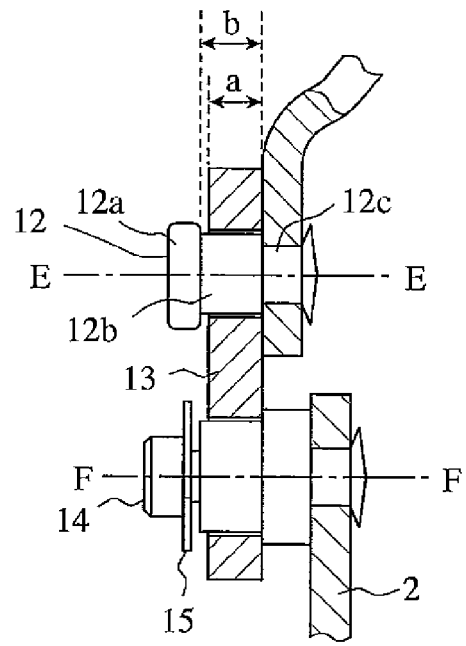
FIG. 3 is an enlarged view of a portion designated by B shown in FIG. 2.

FIG. 3 is an enlarged view of a portion designated by B shown in FIG. 2. In accordance with this Embodiment 1, as shown in the view, the pin 12 has a rivet shape in which three cylinders 12a, 12b, and 12c having different diameters are piled up in such a way that their central axes match one another. After the pin 12 is inserted into penetrating holes formed in the joint 11 and the link plate 13 while the cylinder 12a is placed on a side of the link plate 13, a part of the cylinder 12c which is projecting from the joint 11 is crushed so that the joint 11 and the plate 13 are connected to each other. In this case, the cylinder 12b is formed in such a way that its height b in the axis direction is substantially the same as the thickness a of the link plate 13, and in such a way that there is almost no play in a connecting portion for connecting between the joint 11 and the link plate 13. Furthermore, between the outer surface of the cylinder 12b and the inner surface of the penetrating hole formed in the link plate 13, there is a gap of the order not to interfere with the rotary motion in the connecting portion. Thereby, the play of the connecting portion for connecting the actuator to the lever 2 of the turbocharger which is disposed as the external device which constructs the rotation prevention mechanism can be reduced, and a degree of accuracy required for driving the lever 2 can be ensured. The link plate 13 and the lever 2 are connected to each other by using the pin 14 and the locking ring 15, like in a conventional case.

Figure 4:
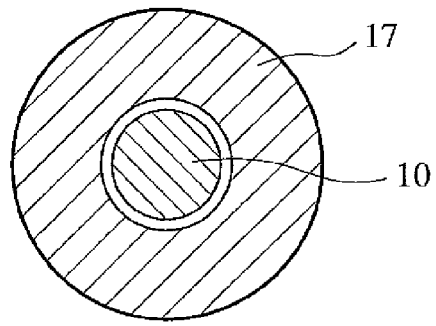
FIG. 4 is a cross-sectional view of an output axis and a boss, taken along the C-C line shown in FIG. 2.

FIG. 4 is a cross-sectional view of the output axis 10 and the boss 17 taken along the C-C line shown in FIG. 2. In accordance with this embodiment, because no rotation prevention mechanism is disposed in the output axis 10 and it is not necessary to increase the outer diameter of the output axis 10 in order to ensure the mechanical strength of the output axis, the output axis 10 can be made to be thinner than conventional output axes. Therefore, the size of the actuator 1 can be reduced.

Figure 5:
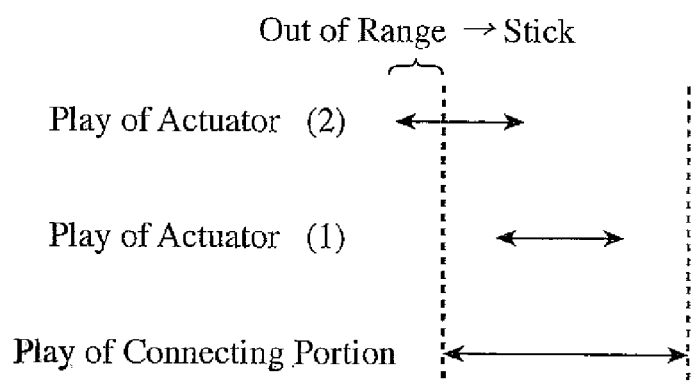
FIG. 5 is a figure showing a relation between a play and occurrence of sticking.

FIG. 5 is a figure showing occurrence of sticking. In a conventional actuator, when connected to an external device, by increasing the play of a connecting portion for connecting the conventional actuator to the external device rather than the play of the rotation prevention mechanism disposed in the output axis, occurrence of sticking at the time of the connection can be avoided. If at the time of this connection the play of the rotation prevention mechanism disposed in the output axis falls within the play range of the connecting portion, as shown in (1) of FIG. 5, no sticking occurs. However, as shown in (2) of FIG. 5, if the play of the rotation prevention mechanism deviates from the play range of the connecting portion, sticking occurs. In contrast, because in the actuator 1 in accordance with this Embodiment 1 the rotation prevention mechanism for preventing the rotary motion of the output axis 10 is constructed of only the connecting portion for connecting the joint 11, the link plate 13, and the lever 2 of the turbocharger which is the external device to one another, occurrence of sticking can be prevented.

Next, the operation of the actuator will be explained.

When a voltage is applied from the not-shown exterior of the actuator to the coil 6 by way of the external I/O connector 3 and the terminal 4, an electromagnetic field is generated and the rotator 8 rotates. Because the output axis 10 is connected to the lever 2 by way of the connecting member, the output axis 10 is prevented from rotating. Therefore, the female screw portion 8a formed in the rotor 8 and the male screw portion 10a formed in the output axis 10 convert the rotary motion of the rotator 8 into linear motion of the output axis 10, so that the output axis 10 moves linearly in a direction of the length thereof. When the output axis 10 moves linearly, the lever 2 which is connected to the output axis 10 by way of the connecting member rotates around the central point D, as shown in FIG. 1, to change the vane open degree of the turbocharger.

As mentioned above, the actuator 1 in accordance with Embodiment 1 is constructed in such a way that the output axis 10 is connected to the lever 2 by way of the connecting member, and the play of the connecting portion for connecting the actuator to the lever 2 of the turbocharger disposed as the external device which is a rotation prevention mechanism is reduced. Therefore, the present embodiment offers an advantage of being able to eliminate the necessity to dispose any rotation prevention mechanism in the output axis 10, downsize the actuator 1 while ensuring the mechanical strength of the output axis 10, and reduce the manufacturing cost of the actuator. Furthermore, because the rotation prevention mechanism for preventing the rotary motion of the output axis 10 is constructed of only the connecting portion for connecting the joint 11, the link plate 13, and the lever 2 to one another, there is provided another advantage of being able to prevent occurrence of sticking. In addition, because the actuator is constructed in such a way that there is almost no play in the connecting portion for connecting between the joint 11 and the link plate 13, as mentioned above, there is provided a further advantage of being able to reduce the play of the connecting portion, and control the vane open degree of the turbocharger with a high degree of precision.

Embodiment 2

Figure 6:
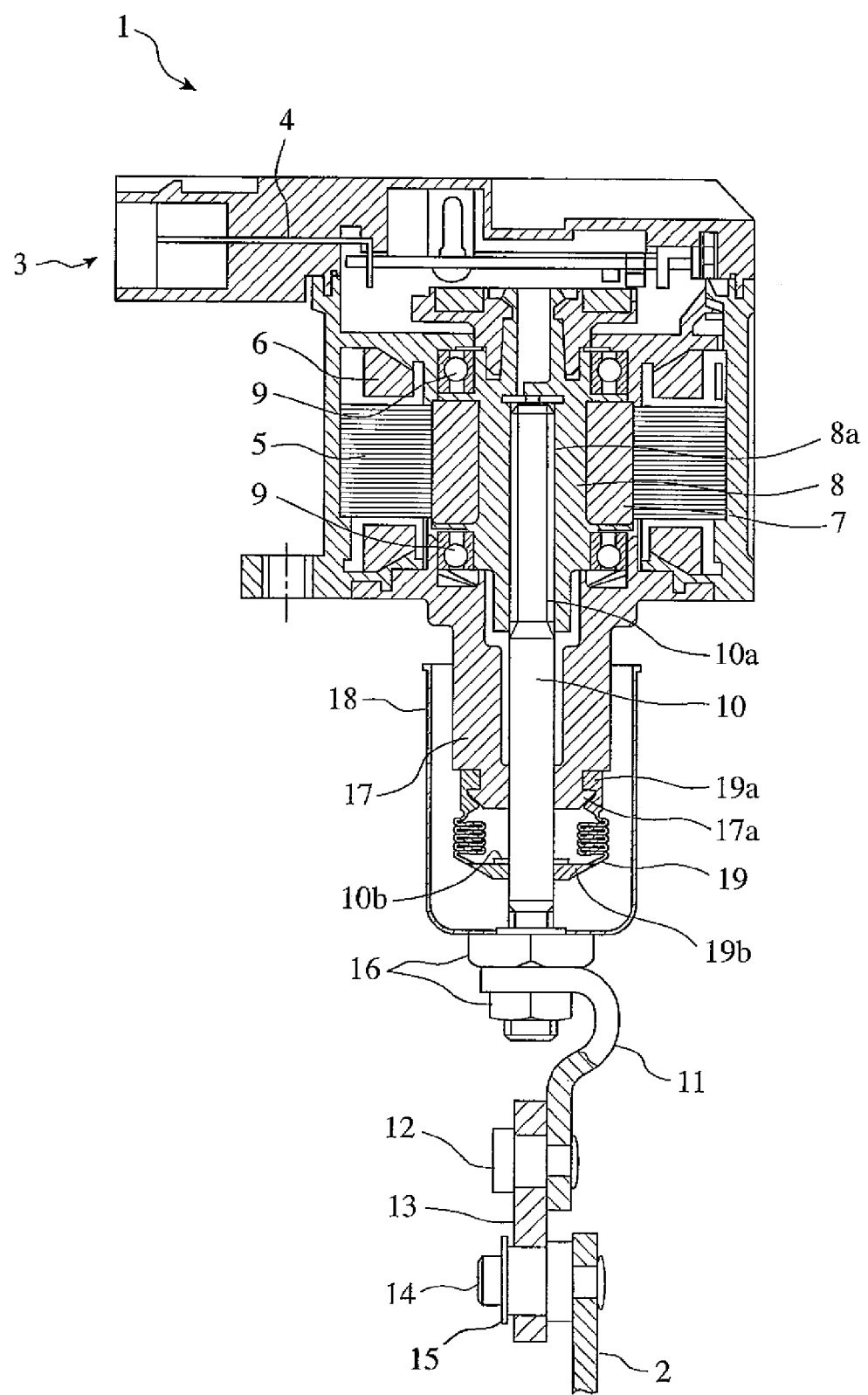
FIG. 6 is a view showing an actuator in accordance with Embodiment 2.
Figure 7:
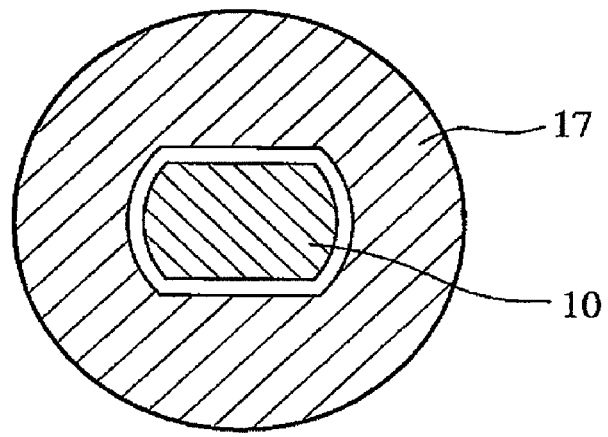
FIG. 7 is a figure showing a mechanism for preventing rotation in accordance with a conventional example.
Figure 8:
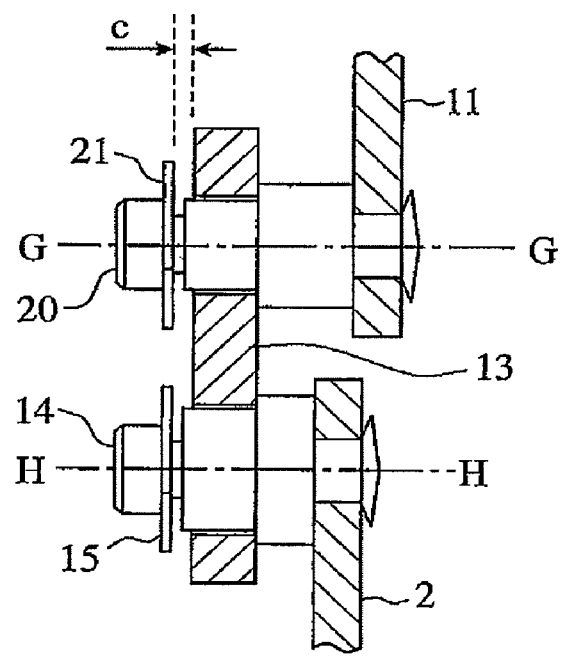
FIG. 8 is a view showing a connecting member in accordance with a conventional example.

FIG. 6 is a view showing an actuator 1 in accordance with Embodiment 2, and the actuator in accordance with this embodiment differs from that of Embodiment 1 in that the actuator in accordance with this embodiment includes a boot 19. Hereafter, the same structural components as those explained with reference to FIG. 2 are designated by the same reference numerals as those shown in the figure, and the duplicated explanation of the structural components will be omitted. The boot 19 has an end 19a which is attached to a projecting portion 17a disposed in the boss 17, and another end 19b which is attached to a projecting portion 10b disposed in the output axis 10. Therefore, the boot 19 expands and contracts according to the linear motion of the output axis 10, and prevents an intruder, e.g., a foreign object, such as dust, or a fluid, such as water, from intruding into the actuator from the gap between the output axis 10 and the boss 17. Furthermore, when the actuator 1 is connected to a turbocharger which is an external device, it is necessary to loosen the nut 16 to adjust the position of the joint 11, though there is provided an advantage of being able to prevent rotation of the output axis 10 by mounting the boot 19 to the actuator, and improve the workability at the time of the connection. This embodiment further provides other advantages which are the same as those offered by Embodiment 1.

INDUSTRIAL APPLICABILITY

As mentioned above, because the actuator in accordance with the present invention prevents occurrence of sticking and reduces its manufacturing cost, and includes a downsized connecting member for connecting the actuator to an external device, the actuator in accordance with the present invention is suitable for adjustment of the vane open degree of a turbocharger.

The invention claimed is:

1. An actuator having an output axis which is moved linearly by a rotatory force, and a boss for holding said output axis in such a way that the output axis can move linearly, wherein
said actuator comprises a connecting member for propagating the linear motion of said output axis to an external device, said connecting member comprises a joint having a first end connected to said output axis, and a link plate having an end rotatably connected to a second end of said joint such that the link plate does not directly contact the output axis, and another end rotatably connected to the external device, and a mechanism for preventing rotation of said output axis is constructed of only a connecting portion for connecting said joint, said link plate, and said external device to one another, wherein the link plate is connected to the second end of the joint with a first pin in such a way that the link plate can rotate around a central axis of the first pin, and wherein the first pin has a rivet shape in which three cylinders having different diameters are connected in such a way that central axes of the three cylinders match one another.

2. The actuator according to claim 1, wherein a boot having an end attached to said output axis and another end attached to a projecting portion disposed in said boss, for preventing an intruder from intruding into said actuator by way of a surface of said output axis.

3. The actuator according to claim 1, wherein the first end of the joint is attached to a leading end of the output axis with a nut.

4. The actuator according to claim 1, wherein at least one of the cylinders is formed in such a way that its height in an axis direction is substantially same as the thickness of the link plate.

5. An actuator having an output axis which is moved linearly by a rotatory force, and a boss for holding said output axis in such a way that the output axis can move linearly, wherein
said actuator comprises a connecting member for propagating the linear motion of said output axis to an external device, said connecting member comprises a joint having a first end connected to said output axis, and a link plate having an end rotatably connected to a second end of said joint such that the link plate does not directly contact the output axis, and another end rotatably connected to the external device, and a mechanism for preventing rotation of said output axis is constructed of only a connecting portion for connecting said joint, said link plate, and said external device to one another, and
wherein the link plate is connected to a lever with a second pin and a locking ring in such a way that the link plate can rotate around a central axis of the second pin.

* * * * *